United States Patent
Ryun (10) Patent No.: US 6,606,222 B1
(45) Date of Patent: Aug. 12, 2003

(54) CONVERGENT CHANNEL, TRENCHED DISC HEAD SLIDER

(75) Inventor: Scott E. Ryun, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/398,993

(22) Filed: Sep. 17, 1999

Related U.S. Application Data (63) Continuation-in-part of application No. 09/157,700, filed on Sep. 21, 1998, now Pat. No. 6,188,547
(60) Provisional application No. 60/117,724, filed on Jan. 29, 1999.

(51) Int. Cl.⁷ .................................................. G11B 5/60
(52) U.S. Cl. .................................................... 360/236.5
(58) Field of Search ............................. 360/235.4, 235.5, 360/235.7, 235.8, 235.9, 236.1, 236.2, 236.5, 236.6–9, 237

(56) References Cited

U.S. PATENT DOCUMENTS

| | | | |
|---|---|---|---|
| 4,212,044 A | 7/1980 | Plotto | 360/103 |
| 4,218,715 A | 8/1980 | Garnier | 360/103 |
| 4,553,184 A | 11/1985 | Ogishima | 360/103 |
| 4,636,894 A * | 1/1987 | Mo | 360/236.3 |
| 4,646,180 A | 2/1987 | Ohtsubo | 360/103 |
| 4,984,114 A | 1/1991 | Takeuchi et al. | 360/103 |
| 5,086,360 A | 2/1992 | Smith et al. | 360/103 |
| 5,128,822 A | 7/1992 | Chapin et al. | 360/103 |
| 5,200,868 A | 4/1993 | Chapin et al. | 360/103 |
| 5,218,494 A | 6/1993 | Chapin et al. | 360/103 |
| 5,317,465 A | 5/1994 | Chapin et al. | 360/103 |
| 5,343,343 A | 8/1994 | Chapin | 360/103 |
| 5,359,480 A | 10/1994 | Nepela et al. | 360/103 |
| 5,430,591 A * | 7/1995 | Takeuchi et al. | 360/236.1 |
| 5,490,026 A | 2/1996 | Dorius et al. | 360/103 |
| 5,513,056 A | 4/1996 | Kawaski et al. | 360/103 |
| 5,550,693 A | 8/1996 | Hendriks et al. | 360/103 |
| 5,636,085 A | 6/1997 | Jones et al. | 360/103 |
| 5,737,151 A | 4/1998 | Bolasna et al. | 360/103 |
| 5,751,517 A * | 5/1998 | Agarwal | 360/235.4 |
| 5,761,004 A | 6/1998 | Peck | 360/103 |
| 5,796,551 A | 8/1998 | Samuelson | 360/103 |
| 5,953,181 A | 9/1999 | Utsunomiya | 360/103 |
| 5,963,396 A | 10/1999 | Burga et al. | 360/103 |
| 5,973,881 A | 10/1999 | Ajiki | 360/103 |
| 6,040,965 A | 3/2000 | Terunuma et al. | 360/122 |
| 6,188,547 B1 * | 2/2001 | Gui et al. | 360/236.8 |
| 6,198,600 B1 | 3/2001 | Kitao et al. | 360/235.2 |
| 6,229,671 B1 * | 5/2001 | Boutaghou et al. | 360/235.1 |
| 6,236,543 B1 * | 5/2001 | Han et al. | 360/235.1 |

FOREIGN PATENT DOCUMENTS

| | | |
|---|---|---|
| JP | 60-242548 | 2/1985 |
| JP | 1-211383 | 8/1989 |
| JP | 1-245480 | 9/1989 |
| JP | 1-319188 | 12/1989 |
| JP | 3-132981 | 6/1991 |

* cited by examiner

Primary Examiner—William Korzuch
Assistant Examiner—Angel Castro
(74) Attorney, Agent, or Firm—Westman, Champlin & Kelly (57) ABSTRACT

A disc head slider includes a slider body having a leading slider edge, a trailing slider edge and a slider length measured from the leading slider edge to the trailing slider edge. First and second raised rails are positioned on the slider body, which have first and second bearing surfaces, respectively. A recessed area is positioned between the first and second side rails and has a recess floor. A first raised pad is positioned rearward of a midpoint along the slider length and includes a third bearing surface, which is generally coplanar with the first and second bearing surfaces. A convergent channel is recessed within the third bearing surface and trails a portion of the recessed area. The convergent channel includes a leading channel end open to fluid flow from the portion of the recessed area, non-divergent channel side walls and a trailing channel end closed to the fluid flow and forward of a localized region of the third bearing surface.

28 Claims, 8 Drawing Sheets

CONVERGENT CHANNEL, TRENCHED DISC HEAD SLIDER

CROSS REFERENCE TO RELATED APPLICATION

The present application is a continuation-in-part of and claims priority of U.S. application Ser. No. 6,188,547 on Feb. 13, 2001.

This application claims the benefit of U.S. Provisional Application Serial No. 60/117,724, entitled "CONVERGENT CHANNEL, TRENCHED AIR BEARING DESIGNS," filed Jan. 29, 1999.

BACKGROUND OF THE INVENTION

The present invention relates to disc drive data storage systems and, more particularly, to a disc drive data storage system having a slider with a convergent channel feature.

Disc drives of the "Winchester" type are well known in the industry. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each head gimbal assembly. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider includes a bearing surface, which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase which creates a hydrodynamic lifting force that counteracts the load force and causes the slider to lift and fly above or in close proximity to the disc surface.

One type of slider is a "self-loading" air bearing slider, which includes a leading taper, a pair of raised side rails, a cavity dam and a subambient pressure cavity. The leading taper is typically lapped or etched onto the end of the slider that is opposite to the recording head. The leading taper pressurizes the air as the air is dragged under the slider by the disc surface. An additional effect of the leading taper is that the pressure distribution under the slider has a peak near the taper end or "leading edge" due to a high compression angle of the taper, and a second peak near the recording end or "trailing edge" due to a low bearing clearance for efficient magnetic recording. This dual-peak pressure distribution results in a bearing with a high pitch stiffness.

The bearing clearance between the slider and the disc surface at the recording head is an important parameter to disc drive performance. It is desired to minimize variation in the head clearance or "flying height". As average flying heights continue to be reduced, it is important to control several metrics of flying height performance, such as flying height sensitivity to process variations, ambient pressure (e.g., altitude) variations, changes in radial position of the slider over the disc surface and resulting head skew, and quick movements of the slider from one radial position to another radial position. Also, the slider should take off from the disc surface as quickly as possible after the start of disc rotation.

The above-mentioned sensitivities are reduced by providing the slider with a high bearing stiffness in the pitch and roll directions. To achieve high pitch and roll stiffness, air bearings have utilized geometries that distribute the positive pressure away from the center of the slider. However, with some bearing geometries, it is difficult to generate sufficient localized pressure along certain areas of the bearing surface. For example, it is difficult to generate localized positive pressure near the trailing edge of a slider having truncated side rails and a discrete center pad positioned at the trailing edge.

More effective bearing features are desired for generating localized pressure along selected areas of a bearing surface.

SUMMARY OF THE INVENTION

One aspect of the present invention relates to a disc head slider including a slider body having a leading slider edge, a trailing slider edge and a slider length measured from the leading slider edge to the trailing slider edge. First and second raised rails are positioned on the slider body, which have first and second bearing surfaces, respectively. A recessed area is positioned between the first and second side rails and has a recess floor. A first raised pad is positioned rearward of a midpoint along the slider length and includes a third bearing surface, which is generally coplanar with the first and second bearing surfaces. A convergent channel is recessed within the third bearing surface and trails a portion of the recessed area. The convergent channel includes a leading channel end open to fluid flow from the portion of the recessed area, non-divergent channel side walls and a trailing channel end closed to the fluid flow and forward of a localized region of the third bearing surface.

Another aspect of the present invention relates to a disc drive assembly, which includes a housing, a disc rotatable about a central axis within the housing, an actuator mounted within the housing and a slider supported over the disc by the actuator. The slider includes a slider body having a leading slider edge, a trailing slider edge and a slider length measured from the leading slider edge to the trailing slider edge. First and second raised rails are positioned on the slider body, which comprise first and second bearing surfaces, respectively. A recessed area is positioned between the first and second side rails and has a recess floor. A first raised pad is positioned rearward of a midpoint along the slider length and includes a third bearing surface, which is generally coplanar with the first and second bearing surfaces. A convergent channel is recessed within the third bearing surface and trails a portion of the recessed area. The convergent channel includes a leading channel end open to fluid flow from the portion of the recessed area, non-divergent channel side walls and a trailing channel end closed to the fluid flow and forward of a localized region of the third bearing surface.

Yet another aspect of the present invention relates to a disc drive assembly, which includes a disc rotatable about a central axis and a slider supported over the disc for generating a fluid bearing between the slider and the disc as the disc rotates beneath the slider about the central axis.

DETAILED DESCRIPTION OF THE ILLUSTRATIVE EMBODIMENTS

Figure 1:
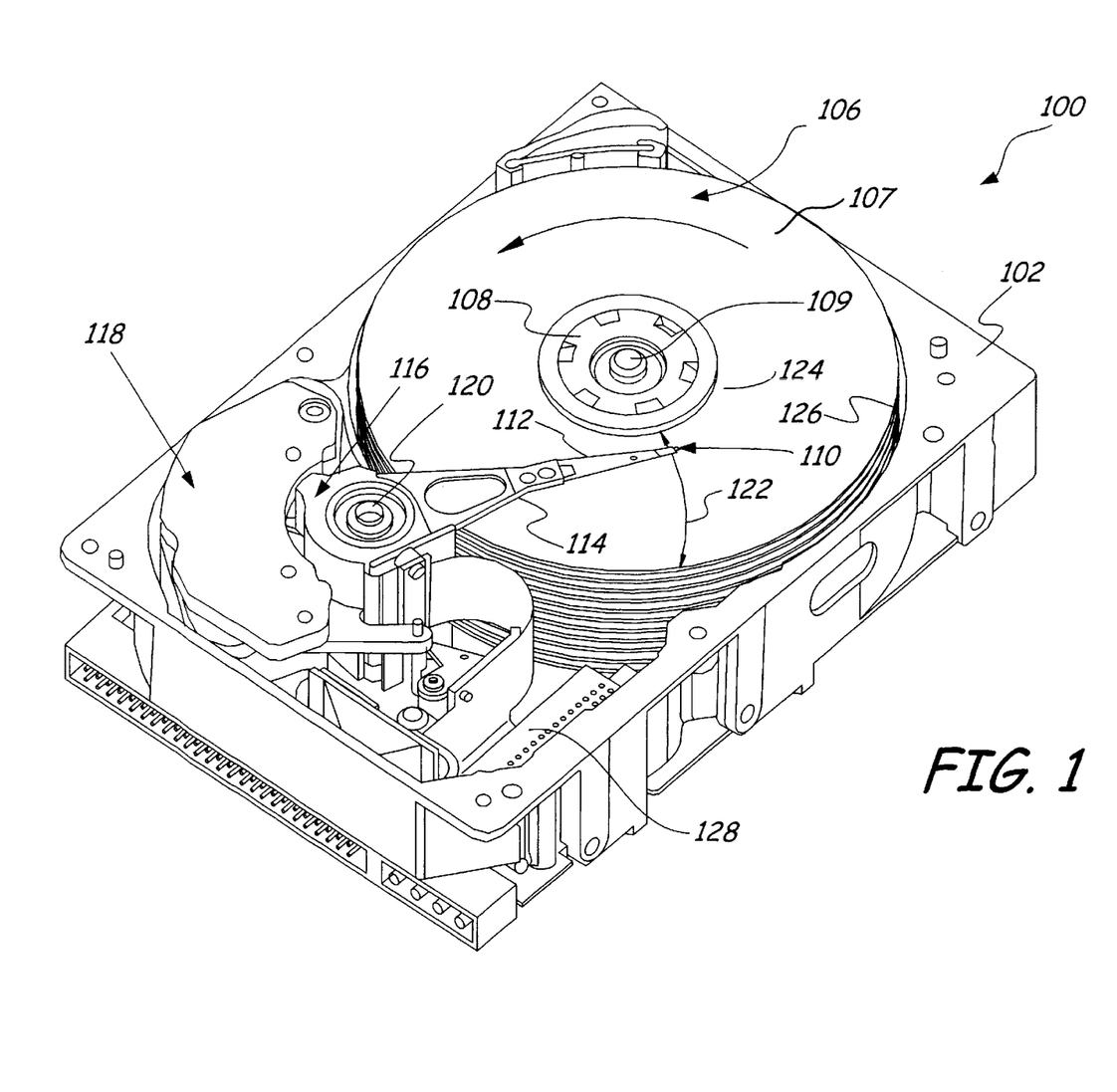
FIG. 1 is a perspective view of a disc drive in which the slider of the present invention can be used.

FIG. 1 is a perspective view of a disc drive 100 in which the present invention is useful. The same reference numerals are used in the various figures to represent the same or similar elements. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs which are mounted for co-rotation about central axis 109. Each disc surface has an associated slider 110 which is mounted to disc drive 100 and carries a read/write head for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

As discussed in more detail below, slider 110 has a hydrodynamic (e.g. air) bearing that maintains a substantially constant separation between the read/write head and the surface of the disc by effectively generating discrete areas of localized positive pressure. These discrete areas help to improve take-off performance, reduce flying height variation due to manufacturing process variations, and reduce stiction between the slider and the disc surface.

Figure 2:
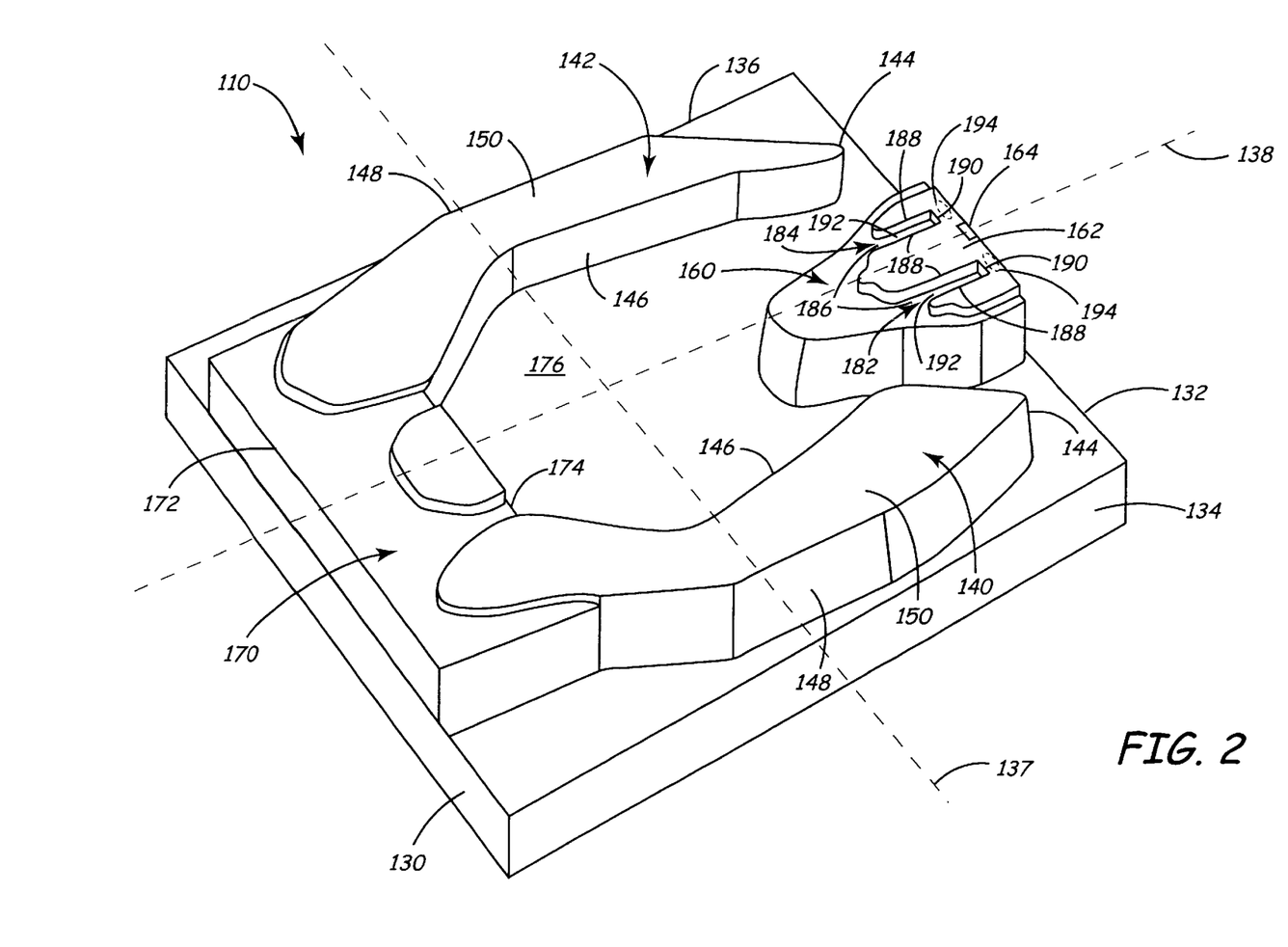
FIG. 2 is a bottom, perspective view of a slider in the disc drive shown in FIG. 1 according to one embodiment of the present invention.

FIG. 2 is a bottom, perspective view of slider 110 according to one embodiment of the present invention. Slider 110 has a leading slider edge 130, a trailing slider edge 132, slider, side edges 134 and 136, a longitudinal center line 137 and a lateral center line 138. Raised side rails 140 and 142 are positioned along side edges 134 and 136, respectively.

Rails 140 and 142 extend generally from leading slider edge 130 toward trailing slider edge 132. Each rail 140 and 142 has a trailing rail edge 144, an inside rail edge 146, an outside rail edge 148 and a bearing surface 150.

A cavity dam 170 extends between rails 140 and 142, along leading slider edge 130. Cavity dam 170 has a leading edge 172 and a trailing edge 174. Cavity dam 170 and rails 140 and 142 define a subambient pressure cavity 176, which trails cavity dam 170 relative to a direction of airflow from leading slider edge 130 toward trailing slider edge 132.

A raised center pad 160 is positioned along trailing slider edge 132 and is centered along lateral center line 138. In alternative embodiments, center pad 160 can be skewed with respect to line 138. Center pad 160 has a bearing surface 162 and supports a read/write transducer 164. Rails 140 and 142 terminate prior to trailing slider edge 132 to allow slider 110 to roll about lateral center line 138 without risking contact between trailing rail edges 144 and the disc surface. The trailing edge of center pad 160, which carries transducer 164, remains the closest location on slider 110 to the disc surface at relatively large roll angles, thereby improving read and write performance. However, truncating side rails 140 and 142 prior to trailing slider edge 132 reduces the amount of positive pressure developed near trailing slider edge 132, which reduces pitch stiffness.

In order to limit the reduction in pitch stiffness, slider 110 further includes a pair of convergent channel features 182 and 184, which are recessed within bearing surface 162 and trail a portion of subambient pressure cavity 176. Channels 182 and 184 each have a leading channel end 186, non-divergent side walls 188, a trailing channel end 190 and a channel floor (or "step surface") 192. Channels 182 and 184 are formed through photolithography processes such as ion milling, chemical etching or Reactive Ion Etching (RIE). With these processes, the depth and location of the channels can be accurately controlled. Leading channel end 186 is open to fluid flow from cavity 176, and trailing channel end 190 is closed to the fluid flow. A portion of the fluid flow from cavity 176 is directed into channels 182 and 184 and is forced to exit the channels over trailing channel ends 190. This creates localized positive pressure areas 194 rearward of trailing channel ends 190. In the embodiment shown in FIG. 2, these localized positive pressure areas 194 are positioned adjacent trailing slider edge 132 for increasing the pitch stiffness of slider 110.

Figure 3:
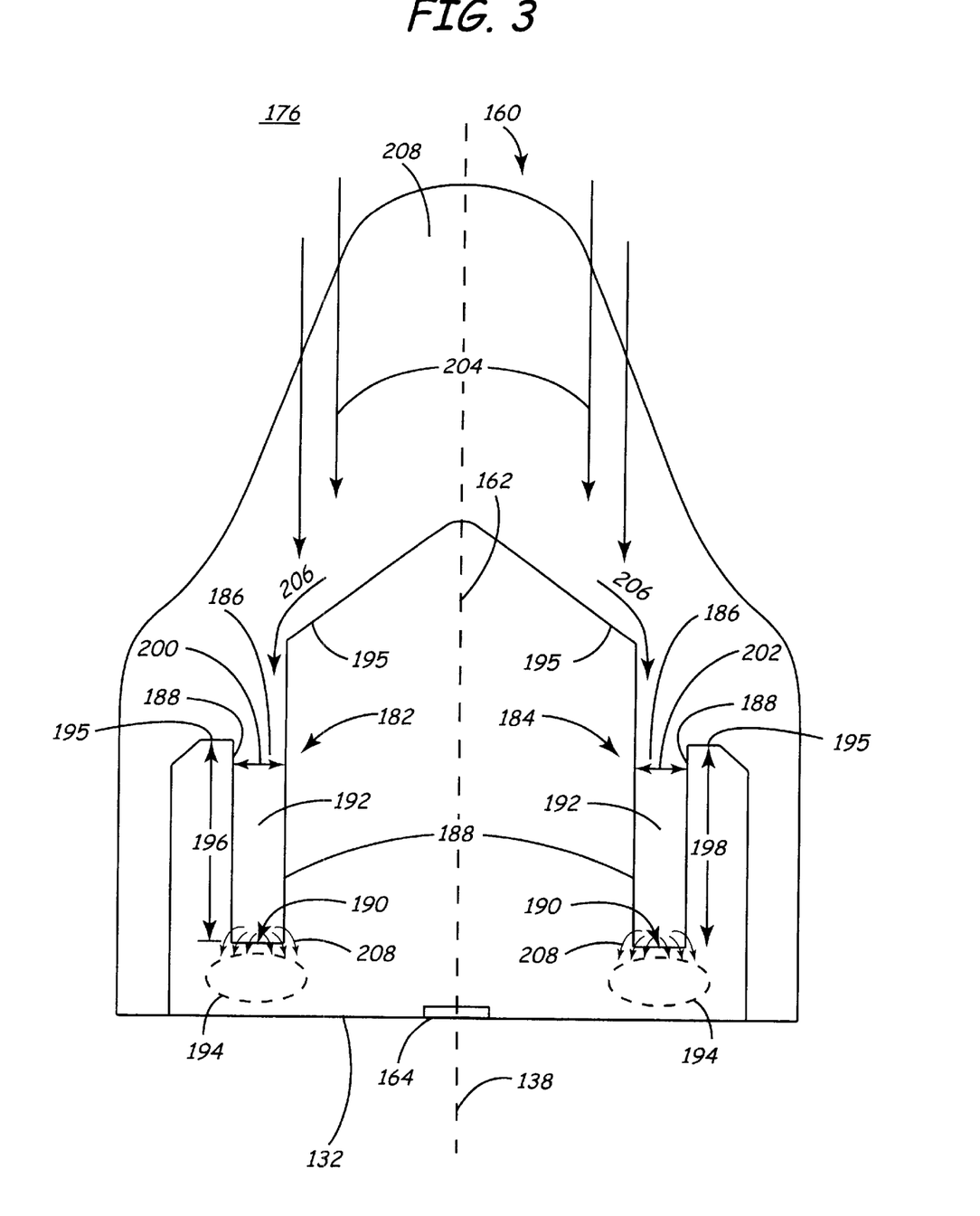
FIG. 3 is a bottom plan view of a raised center pad shown in FIG. 2, which illustrates a pair of convergent channel features in greater detail.

FIG. 3 is a bottom plan view of pad 160 which illustrates channels 182 and 184 in greater detail. Arrows 204 illustrate the direction of fluid flow travel from cavity 176. The leading ends 186 of each channel has a side wall 195 to either side of it. Walls 195 present themselves as a substantial pressure rise to the local fluid flow. However, the opening to each channel, at leading ends 186, does not have the same pressure rise and is seen as a preferential path for the fluid flow to travel. Once the fluid flow enters channels 182 and 184, the flow is essentially bounded by side walls 188 and trailing end 190 and is forced to rise over trailing end 190. This creates the localized pressure areas 194 at discrete regions near the trailing slider edge 132. The ability to control the location of the pressure rise allows the slider designer more freedom with the remainder of the bearing geometry, which can result in significant design improvements. Channels 182 and 184 can be symmetrical about lateral center line 138, as shown in FIG. 3, or can be asymmetrical to provide preferential pressurization at certain slider skew angles.

One or more convergent channels can be placed anywhere on the slider where a localized pressure area is desired.

These positions include, but are not limited to, any location along trailing slider edge 132 and/or rearward of a longitudinal midpoint of slider 110 along longitudinal center line 137 (shown in FIG. 2), which receives air flow from a portion of cavity 176.

The size and intensity of positive pressure areas 194 depend on the channel length to width ratio, the absolute size of channels 182 and 184 and the depth and shape of channel floors 192. Channels 182 and 184 have channel widths 200 and 202, respectively, which are measured between side walls 188. Channels 182 and 184 have channel lengths 196 and 198, respectively, which are measured from leading channel ends 186 to trailing channel ends 190. In one embodiment, the ratio of channel lengths 196 and 198 to channel widths 200 and 202 range from 0.5 to 5.0, but may vary outside that range depending on the design purposes of the channel feature. In another embodiment, the length to width ratio ranges from 2.0 to 2.5. In yet another embodiment, the length to width ratio ranges from 4.0 and 5.0. The length to width ratios of channels 182 and 184 may be different from one another, and may vary within a channel.

In the embodiment shown in FIGS. 2 and 3, channel floors 192 are parallel to bearing surface 162 and are recessed from bearing surface 162 by 0.05 to 1.5 microns. Channel floors 192 are coplanar with a leading step surface 208, which is formed in the leading end of center pad 160. In an alternative embodiment, (not shown), channel floors 192 are coplanar with the recessed floor of cavity 176. In another alternative embodiment (also not shown), channel floors 192 slope upward toward bearing surface 162 as the channel floors extend from leading channel edge 186 (or from the leading end of center pad 160) toward trailing channel edge 190.

Figure 4:
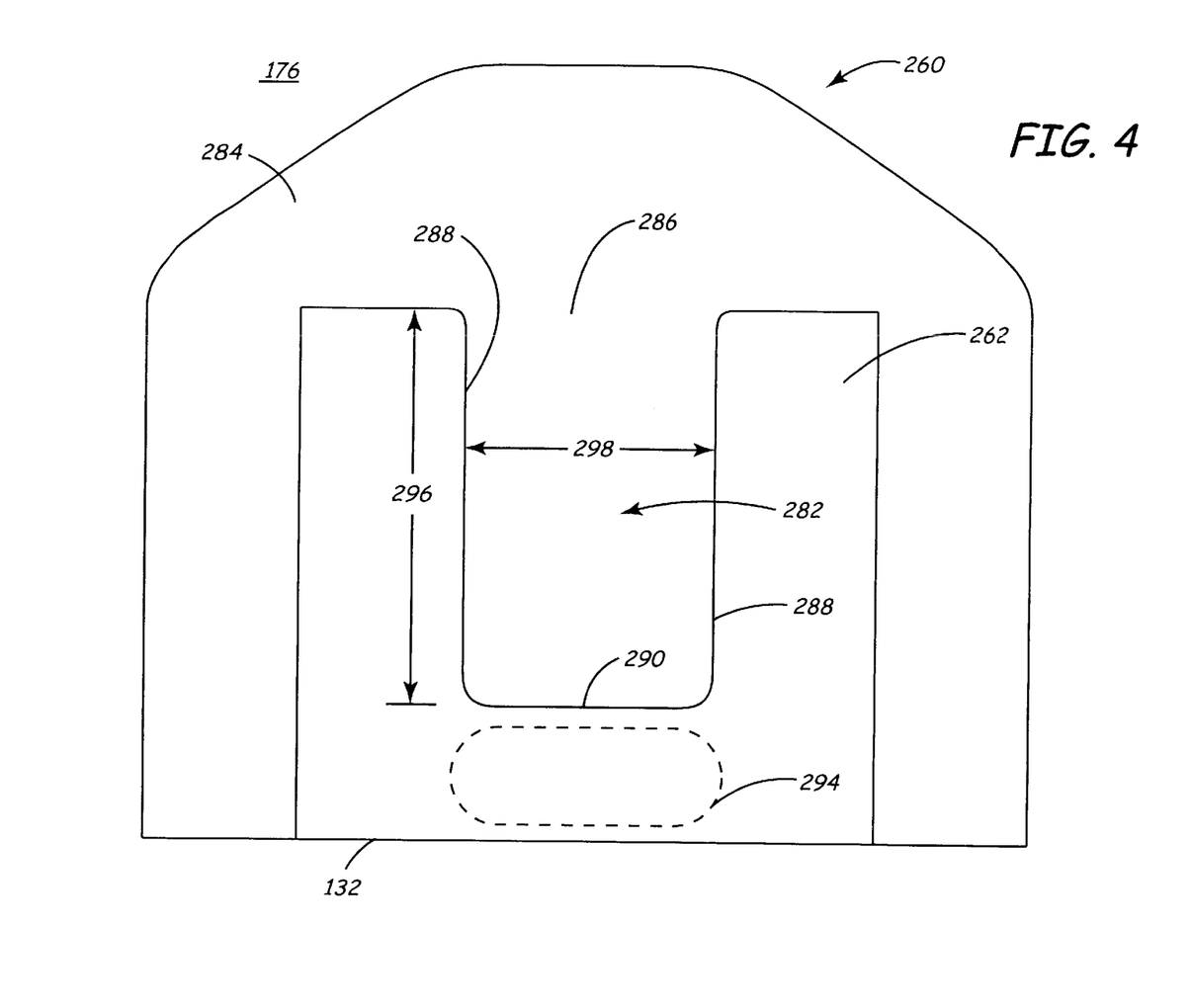
FIG. 4 is a bottom plan view of a raised center pad having a single convergent channel feature recessed in the pad bearing surface.

FIG. 4 is a bottom plan view of a raised pad 260 having a single convergent channel feature 282, according to an alternative embodiment of the present invention. The same reference numerals are used in FIG. 4 as were used in FIGS. 2 and 3 for the same or similar elements. Raised pad 260 has a bearing surface 262 and a leading step surface 284, which is raised from the recessed floor of cavity 176. Channel 282 has a leading channel end 286, which is open to fluid flow from cavity 176, non-divergent channel walls 288, a trailing channel end 290, which is closed to the fluid flow, and a channel floor 292. Channel 282 has a length 296 and a width 298. In this embodiment, channel 282 has a length-to-width ratio of about 1.5. A localized positive pressure area 294 is generated by channel 282 at a location that is rearward of trailing channel end 190 and just forward of trailing slider edge 132.

Figure 5:
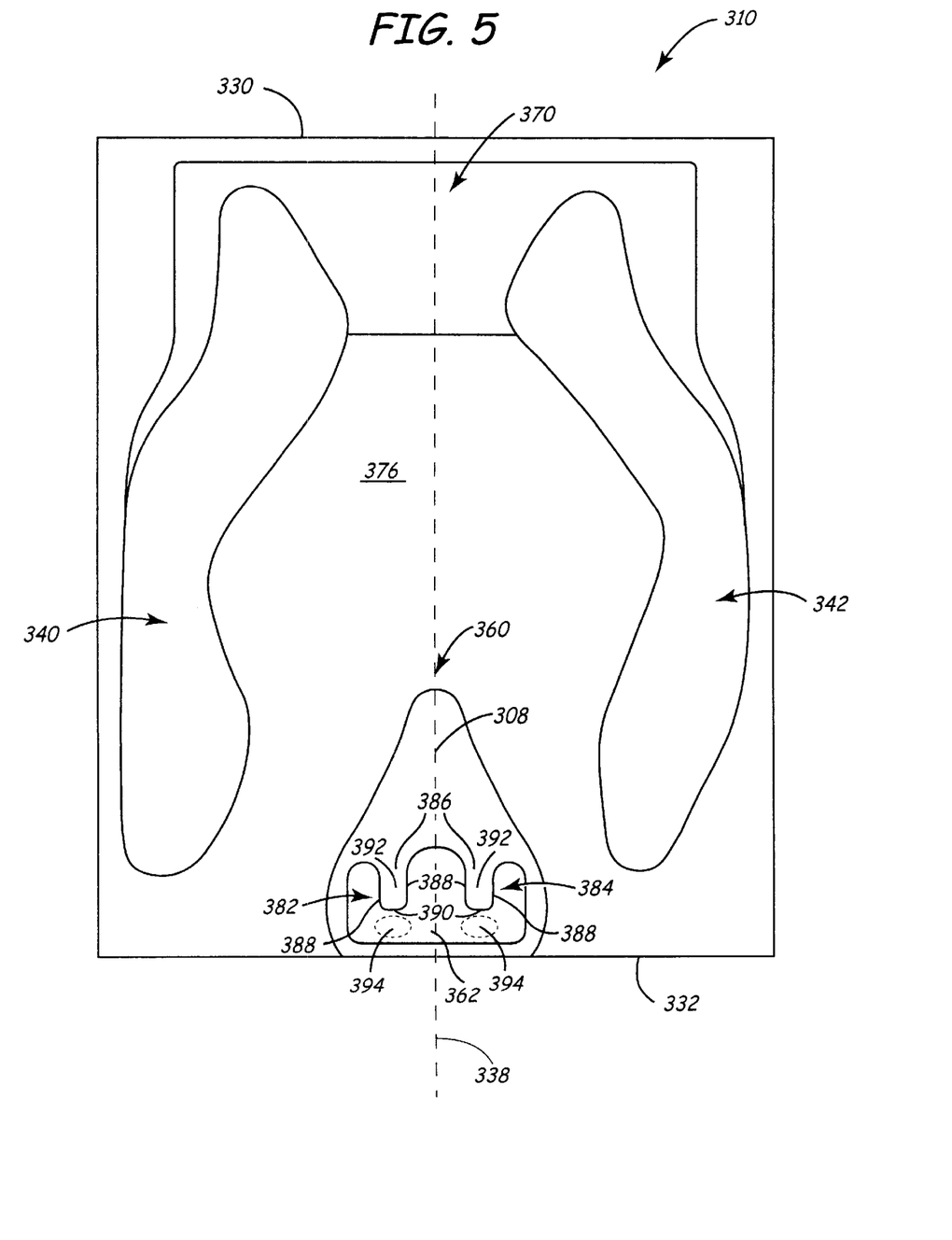
FIG. 5 is a bottom plan view of a slider having a raised center pad with convergent channel features according to an alternative embodiment of the present invention.

FIG. 5 is a bottom plan view of an alternative slider embodiment 310 having modified channels 382 and 384. Slider 310 has similar features to slider 110 illustrated in FIG. 2, such as a leading slider edge 330, a trailing slider edge 332, a lateral center line 338 and raised side rails 340 and 342. A raised center pad 360 is positioned along trailing slider edge 332, is centered about lateral center line 338 and has a bearing surface 362. A cavity dam 370 extends between rails 340 and 342 along leading slider edge 330. Cavity dam 370 and side rails 340 and 342 define a subambient pressure cavity 376.

Slider 310 further includes a pair of convergent channel features 382 and 384, which differ slightly in design from the channel features 182 and 184 illustrated in FIG. 2. Leading channel ends 386 are rounded and widened for a more smooth transition of fluid flow from cavity 376 into the channels 382 and 384. Side walls 388 converge toward one another from leading channel ends 386 to rounded trailing channel ends 390. Rounded trailing channel ends 390 provide a smooth surface for even fluid flow over the channel ends, generating positive pressure areas 394 near trailing slider edge 332.

Figure 6:
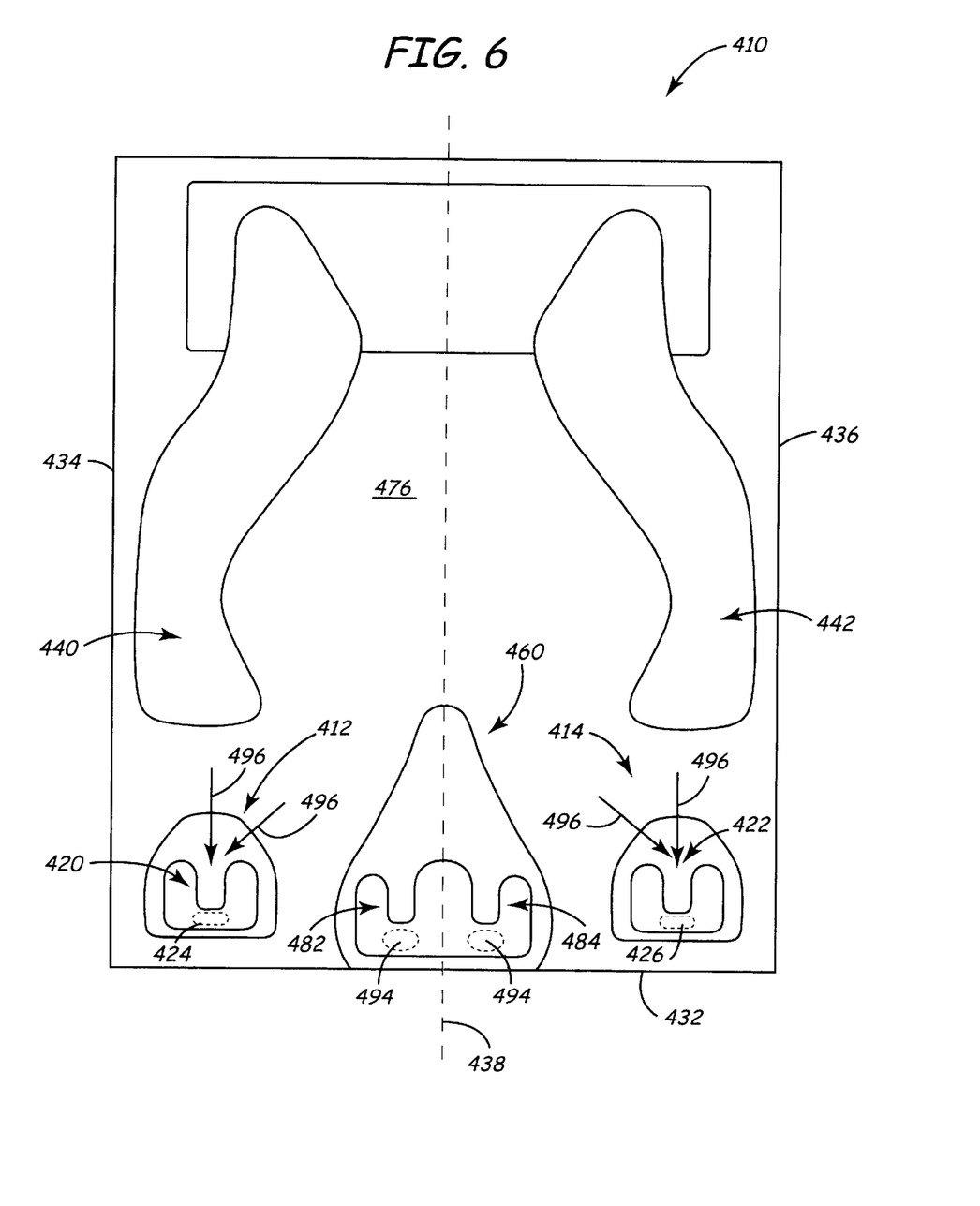
FIG. 6 is a bottom plan view of a slider having a raised center pad and a pair of discrete raised side pads having convergent channel features according to another alternative embodiment of the present invention.

FIG. 6 is a bottom plan view of a slider 410 according to another alternative embodiment of the present invention. Slider 410 has a raised center pad 460 and a pair of raised side pads 412 and 414. Center ad 460 is similar to center pad 360 shown in FIG. 5 and as a pair of convergent channel features 482 and 484. Center pad 460 is positioned at trailing slider edge 432 and is centered (or, alternatively, skewed) about lateral center line 438. Channels 482 and 484 generate localized positive pressure areas 494.

Slider 410 further includes a pair of raised side pads 412 and 414, which are positioned along slider side edges 434 and 436, respectively, and adjacent trailing slider edge 432. Side pads 412 and 414 are positioned rearward of and are discrete from side rails 440 and 442. Side pads 412 and 414 each have a single convergent channel feature 420 and 422, respectively, which is open to fluid flow from a portion of cavity 476, as indicated by arrows 496. Channels 420 and 422 generate localized positive pressure areas 424 and 426, respectively, near the outside corners of trailing slider edge 432 for increasing both pitch and roll stiffness of slider 410.

Figure 7:
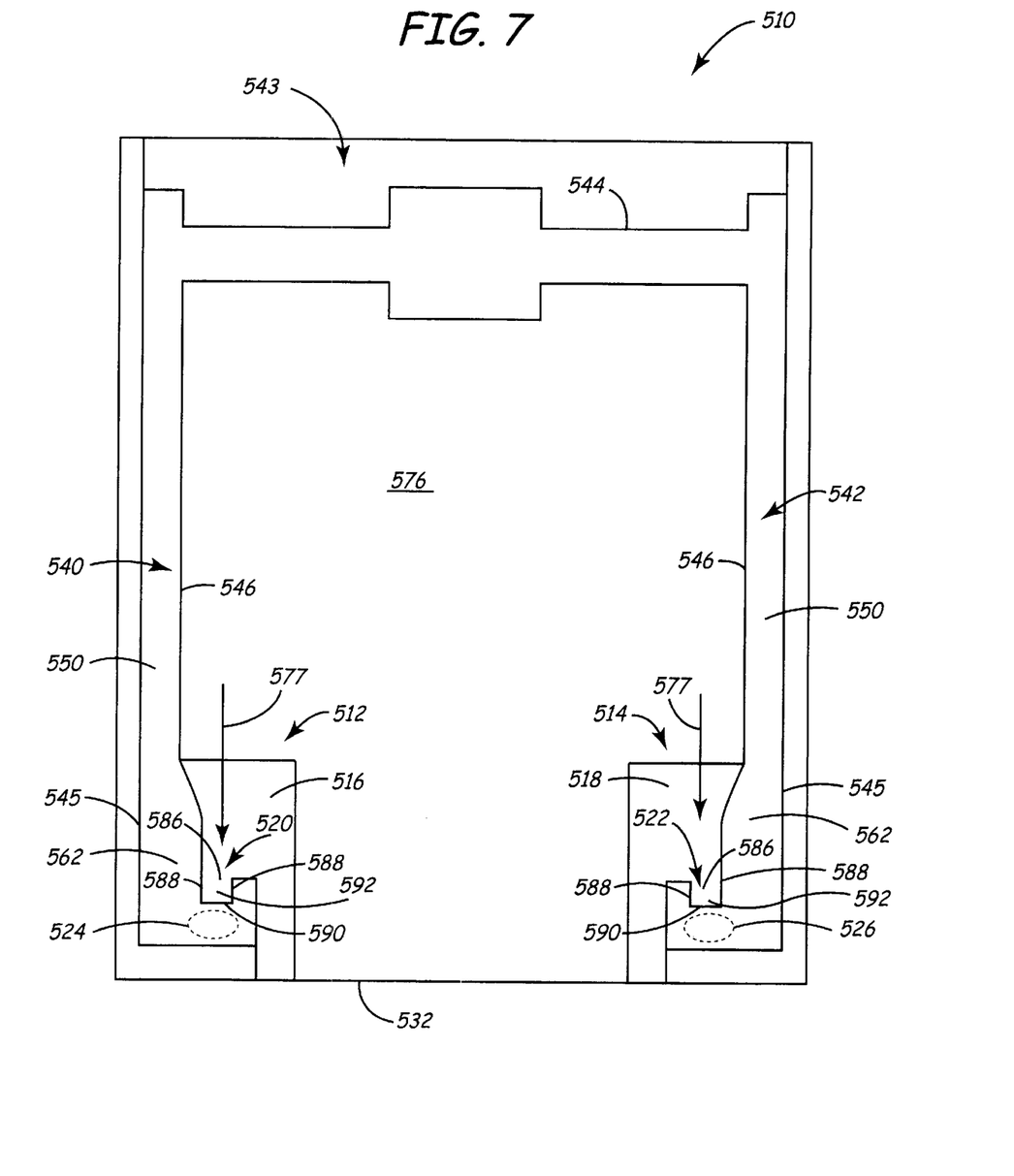
FIG. 7 is a bottom plan view of a slider having raised side pads as extensions of respective raised side rails according to another alternative embodiment of the present invention.

FIG. 7 is a bottom plan view of a slider 510 according to another alternative embodiment. Slider 510 includes side rails 540 and 542, leading step surface 543, cavity dam 544, subambient pressure cavity 576 and raised pads 512 and 514. Raised pad 512 is formed within a trailing portion 545 of raised rail 540, and raised pad 514 is formed within a trailing portion 545 of raised rail 542. As a result, bearing surfaces 550 of raised rails 540 and 542 are continuous and coplanar with bearing surfaces 562 of raised pads 512 and 514. Convergent channel features 520 and 522 are positioned generally along inside rail edges 546 of the raised rails 540 and 542 such that leading channel ends 586 of channels 520 and 522 are open to fluid flow from cavity 576, as indicated by arrows 577. Channels 520 and 522 include non-divergent side walls 588, trailing channel ends 590, which are closed to fluid flow, and channel floors 592. Fluid flow over trailing channel ends 590 generates localized positive pressure areas 524 and 526 at a location near trailing slider edge 532. Raised pads 512 and 514 further include leading step surfaces 594 and 596, respectively, which are recessed from bearing surfaces 562 and raised from cavity 576 for assisting in pre-pressurizing air flow from cavity 576.

Figure 8:
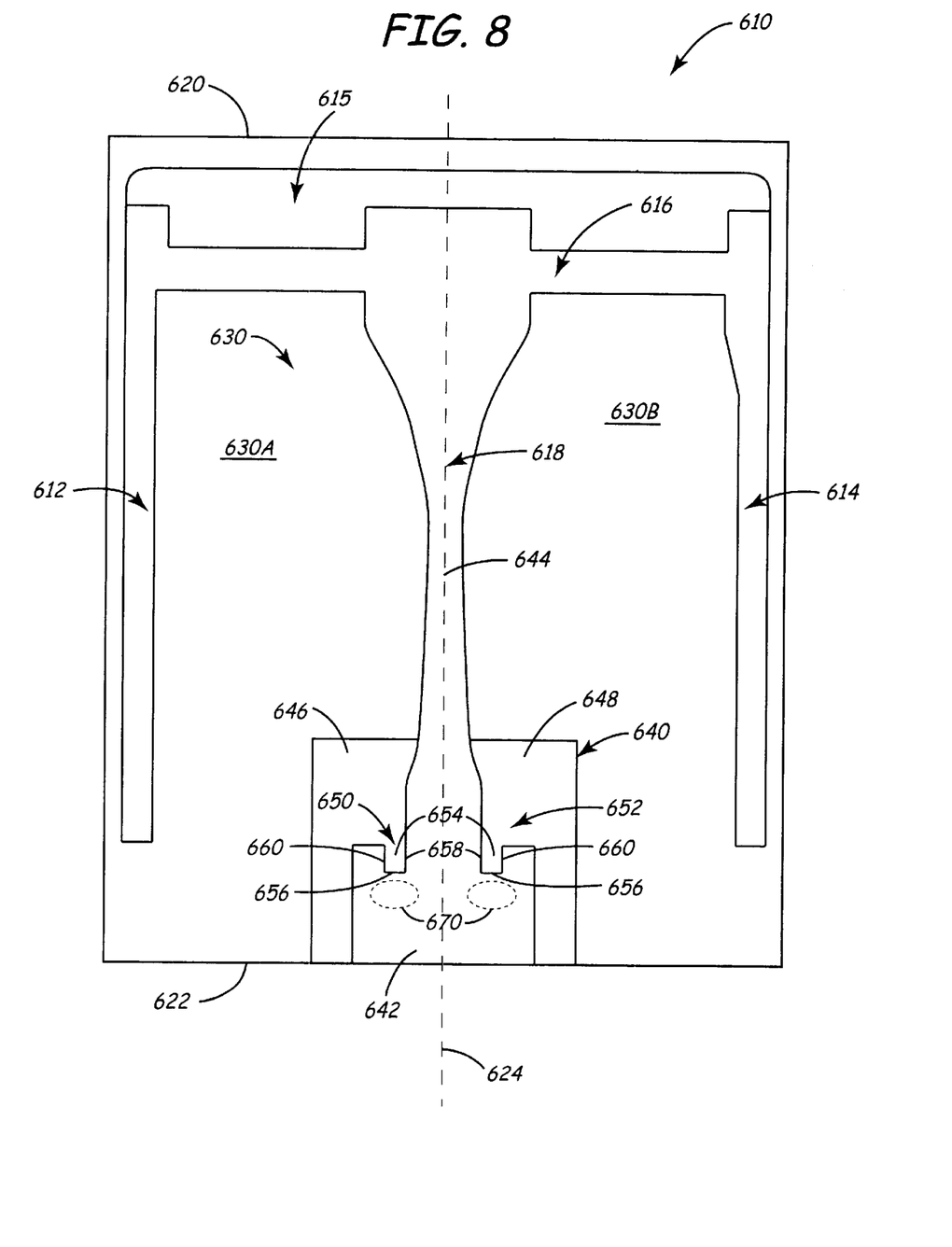
FIG. 8 is a bottom plan view of a slider having a raised center pad as an extension of a raised center rail according to another alternative embodiment of the present invention.

FIG. 8 is a bottom plan view of a slider 610 according to another alternative embodiment of the present invention. Slider 610 includes side rails 612 and 614, leading step surface 615, cavity dam 616, center rail 618, leading slider edge 620, trailing slider edge 622 and lateral center line 624. Center rail 618 extends from cavity dam toward trailing slider edge 622, between side rails 612 and 614. Cavity dam 616 defines a subambient pressure cavity 630 between side rails 612 and 614 that is divided into first and second cavity portions 630A and 630B by center rail 618.

A raised center pad 640 is formed within raised center rail 618, generally along trailing slider edge 622. Raised center pad 640 has a bearing surface 642 which is coplanar and contiguous with a bearing surface 644 formed on center rail 618. Center pad 640 further includes leading step surfaces 646 and 648 and convergent channel features 650 and 652. Leading step surfaces 646 and 648 are raised from cavity portions 630A and 630B and are recessed from bearing surfaces 642 and 644 for pre-pressurizing air flow received from cavity portions 630A and 630B, respectively.

Channel 650 is recessed within bearing surface 642 along a first side of center rail 618, and channel 652 is recessed within bearing surface 642 along a second, opposite side of center rail 618. Channel 650 has a leading end 654, which is open to fluid flow from cavity portion 630A, a trailing end 656, which is closed to the fluid flow, and first and second side walls 658 and 660. Similarly, channel 652 has a leading end 654, which is open to fluid flow from cavity portion 630A, a trailing end 656, which is closed to the fluid flow, and first and second side walls 658 and 660.

In the embodiment shown in FIG. 8, fluid flow from cavities 630A and 630B enters the respective convergent channels 650 and 652 through leading channel ends 654 and is forced to exit the channels over trailing channel ends 656, thereby generating localized positive pressure areas 670 on bearing surface 662 rearward of channels 650 and 652 and near trailing slider edge 622.

Although the present invention has been described with reference to preferred embodiments, workers skilled in the art will recognize that changes may be made in form and detail without departing from the spirit and scope of the invention. For example, the convergent channel features can be used on positive pressure air bearing ("PPAB") sliders as well as negative pressure air bearing ("NPAB") sliders. In PPAB sliders, the cavity dam is eliminated, and a recessed area extends from the leading slider edge to the trailing slider edge, along the raised rails. The term "recessed area" used in the specification and the claims should therefore be interpreted to include a subambient pressure cavity or any other recess that develops ambient, subambient or slightly positive pressure.

What is claimed is:

1. A disc head slider comprising:
    a slider body comprising a leading slider edge, a trailing slider edge and a slider length measured from the leading slider edge to the trailing slider edge;
    first and second raised rails positioned on the slider body, which comprise first and second bearing surfaces, respectively;
    a recessed area positioned between the first and second rails and having a recess floor;
    a first raised pad positioned rearward of a midpoint along the slider length and comprising a third bearing surface; and
    a first convergent channel recessed within the third bearing surface and trailing a portion of the recessed area, wherein the first convergent channel comprises a leading channel end open to fluid flow from the portion of the recessed area, non-divergent channel side walls and a trailing channel end closed to the fluid flow and forward of a localized region of the third bearing surface.

2. The disc head slider of claim 1 wherein the first convergent channel further comprises a channel length measured from the leading channel end to the trailing channel end and a channel width measured between the non-divergent channel side walls and wherein the ratio of the channel length to the channel width is 0.5 to 5.0.

3. The disc head slider of claim 2 wherein the ratio is 2 to 5.0.

4. The disc head slider of claim 1 wherein:
    the first raised pad comprises a leading step surface which is raised from the recess floor and is recessed from the third bearing surface by 0.05 to 1.5 microns; and
    the first convergent channel further comprises a channel floor, which is coplanar with the leading step surface.

5. The disc head slider of claim 1 wherein the first convergent channel further comprises a channel floor, which is coplanar with the recess floor.

6. The disc head slider of claim 1 wherein the first raised pad is a discrete pad, which is positioned along the trailing slider edge, between the first and second raised rails.

7. The disc head slider of claim 6 and further comprising a second convergent channel recessed within the third bearing surface and trailing the portion of the recessed area, wherein the second convergent channel comprises a leading channel end open to fluid flow from the portion of the recessed area, non-divergent channel side walls and a trailing channel end closed to the fluid flow.

8. The disc head slider of claim 6 wherein the first and second raised rails each have a trailing rail edge and terminate prior to the trailing slider edge, and wherein the trailing channel end is positioned along the slider length, between the trailing rail edges of the first and second raised rails and the trailing slider edge.

9. The disc head slider of claim 6 wherein the first raised pad further comprises a leading pad edge, first and second pad side edges and a leading step surface, which extends along the leading pad edge and the first and second pad side edges to partly surround the third bearing surface, wherein the leading step surface is raised from the recess floor and is recessed from the third bearing surface.

10. The disc head slider of claim 6 wherein the first and second raised rails terminate prior to the trailing slider edge and wherein the slider further comprises:
    second and third discrete raised pads, which are laterally spaced on respective sides of the first raised pad and are positioned between the trailing slider edge and the first and second raised rails, respectively; and
    second and third convergent channels recessed within the second and third raised pads, respectively, wherein the second and third convergent channels each comprise a leading channel end open to fluid flow from the recessed area, non-divergent channel side walls and a trailing channel end closed to the fluid flow from the recessed area.

11. The disc head slider of claim 1 and further comprising a cavity dam extending between the first and second raised rails and defining a subambient pressure cavity within the recessed area, downstream of the cavity dam.

12. The disc head slider of claim 1 wherein the first convergent channel further comprises a channel floor, which slopes upward toward the third bearing surface as the channel floor extends from the leading channel end to the trailing channel end.

13. The disc head slider of claim 1 and further comprising:
    a cavity dam extending between the first and second raised rails and defining a subambient pressure cavity within the recessed area, downstream of the cavity dam;
    a raised center rail extending from the cavity dam toward the trailing slider edge, between the first and second raised rails; and
    wherein the first raised pad is formed within the raised center rail, generally altng the trailing slider edge.

14. The disc head slider of claim 13 wherein:
    the raised center rail divides the subambient pressure cavity into first and second cavity portions located between
    the raised center rail and the first and second raised rails, respectively;

the first convergent channel is positioned along a first side of the first raised pad and the leading channel end of the first convergent channel is open to fluid flow from the first cavity portion; and the disc head slider further comprises a second convergent channel recessed within the third bearing surface along a second side of the first raised pad, wherein the second convergent channel comprises a leading channel end open to fluid flow from the second cavity portion, non-divergent channel side walls and a trailing channel end closed to the fluid flow from the second cavity portion.

15. The disc head slider of claim 14 wherein the first raised pad further comprises:

a first leading step surface, which is positioned between the leading channel end of the first convergent channel and the first cavity portion and which is raised from the recess floor and is recessed from the third bearing surface by 0.05 to 1.5 microns, wherein the first convergent channel further coniprises a channel floor, which is coplanar with the first leading step surface; and a second leading step surface, which is positioned between the leading channel end of the second convergent channel and the second cavity portion and which i.e raised from the recess floor and is recessed from the third bearing surface by 0.05 to 1.5 microns, wherein the second convergent channel further comprises a channel floor, which is coplanar with the second leading step surface.

16. The disc head slider of claim 1 wherein:

the first and second raised rails each comprise inside and outside rail edges, wherein the inside rail edges are adjacent the recessed area;

the first raised pad is formed within a trailing portion of the first raised rail;

the first convergent channel is positioned generally along the inside rail edge of the first raised rail such that the leading channel end of the first convergent channel is open to fluid flow from the recessed area; and the disc head slider further comprises a second raised pad, which is formed within a trailing portion of the second raised rail and comprises a fourth bearing surface, which is generally coplanar with the first, second and third bearing surfaces; and the disc head slider further comprises a second convergent channel, which is recessed within the fourth bearing surface generally along the inside rail edge of the second raised rail and comprises a leading channel end open to fluid flow from the recessed area, non-divergent channel side walls and a trailing channel end closed to the fluid flow from the recessed area.

17. A disc drive assembly comprising:

a housing;

a disc rotatable about a central axis within the housing;

an actuator mounted within the housing; and a slider supported over the disc by the actuator and comprising:

a slider body comprising a leading slider edge, a trailing slider edge and a slider length measured from the leading slider edge to the trailing slider edge;

first and second raised rails positioned on the slider body, which comprise first and second bearing surfaces, respectively;

a recessed area positioned between the first and second rails and having a recess floor;

a first raised pad positioned rearward of a midpoint along the slider length and comprising a third bearing surface; and a first convergent channel recessed within the third bearing surface and trailing a portion of the recessed area, wherein the first convergent channel comprises a leading channel end open to fluid flow from the portion of the recessed area, non-divergent channel side walls and a trailing channel end closed to the fluid flow and forward of a localized region of the third bearing surface.

18. A disc drive assembly comprising:

a disc rotatable about a central axis; and slider means supported over the disc for generating a fluid bearing having a bearing surface, a recessed area relative to the bearing surface, and a recessed convergent channel, which is positioned rearward of a midpoint along the slider means, has a leading end open to fluid flow from a portion of the recessed area, and has a trailing channel end that is closed to fluid flow within the channel and thereby generates a localized positive pressure area rearward of the trailing channel end, between the slider means and the disc as the disc rotates beneath the slider means about the central axis.

19. A disc head slider comprising:

a slider body comprising a leading slider edge, a trailing slider edge and a slider length measured from the leading slider edge to the trailing slider edge;

first and second rails positioned on the slider body;

a recessed area positioned between the first and second rails and having a recess floor;

a bearing surface positioned rearward of a midpoint along the slider length; and a first convergent channel recessed within the bearing surface and trailing a portion of the recessed area, wherein the first convergent channel comprises a leading channel end open to fluid flow from the portion of the recessed area, non-divergent channel side walls and a trailing channel end closed to the fluid flow and forward of a localized region of the bearing surface.

20. The disc head slider of claim 14 wherein:

the first bearing surface is formed on a first raised pad, which is positioned on the slider body;

the first raised pad comprises a leading step surface which is raised from the recess floor and is recessed from the first bearing surface; and the first convergent channel further comprises a channel floor, which is coplanar with the leading step surface.

21. The disc head slider of claim 14 wherein the first convergent channel further comprises a channel floor, which is coplanar with the recess floor.

22. The disc head slider of claim 14 wherein the first bearing surface is formed on a first discrete raised pad which is positioned. along the trailing slider edge, between the first and second rails.

23. The disc head slider of claim 17 and further comprising a second convergent channel recessed within the first bearing surface and trailing the portion of the recessed area, wherein the second convergent channel comprises a leading channel end open to fluid flow from the portion of the recessed area, non-divergent channel side walls and a trailing channel end closed to the fluid flow.

24. The disc head slider of claim 17 wherein the first and second rails terminate prior to the trailing slider edge and wherein the slider further comprises:

second and third discrete raised pads, which are laterally spaced on respective sides of the first raised pad and are positioned between the trailing slider edge and the first and second rails, respectively; and second and third convergent channels recessed within the second and third raised pads, respectively, wherein the second and third convergent channels each comprise a leading channel end open to fluid flow from the recessed area, non-divergent channel side walls and a trailing channel end closed to the fluid flow from the recessed area.

25. The disc head slider of claim 14 and further comprising a cavity dam extending between the first and second rails and defining a subambient pressure cavity within the recessed area, downstream of the cavity dam.

26. The disc head slider of claim 25 and further comprising:

a raised center rail extending from the cavity dam toward the trailing slider edge, between the first and second rails; and wherein the first bearing surface is formed within the raised center rail, generally along the trailing slider edge.

27. The disc head slider of claim 19 wherein the first convergent channel further comprises a channel floor which slopes upward toward the first bearing surface as the channel floor extends from the leading channel end toward the trailing channel end.

28. The disc head slider of claim 19 wherein:

the first and second rails each comprise inside and outside rail edges, wherein the inside rail edges are adjacent the recessed area;

the first bearing surface is formed within a trailing portion of the first rail;

the first convergent channel is positioned generally along the inside rail edge of the first rail such that the leading channel end of the first convergent channel is open to fluid flow from the recessed area; and the disc head slider further comprises a second bearing surface, which is formed within a trailing portion of the second rail and is generally coplanar with the first bearing surface: and the disc head slider further comprises a second convergent channel, which is recessed within the second bearing surface generally along the inside rail edge of the second rail and comprises a leading channel end open to fluid flow from the recessed area, non-divergent channel side walls and a trailing channel end closed to the fluid flow from the recessed area.

\* \* \* \* \*

UNITED STATES PATENT AND TRADEMARK OFFICE
CERTIFICATE OF CORRECTION

PATENT NO. : 6,606,222 B1
APPLICATION NO. : 09/398993
DATED : August 12, 2003
INVENTOR(S) : Scott E. Ryun

It is certified that error appears in the above-identified patent and that said Letters Patent is hereby corrected as shown below:

Column 8
Line 61, delete "altng" and insert --along--.
Line 65, delete the space after the word "between".

Column 9
Line 26, delete "i.e." and insert --is--.

Signed and Sealed this

Twenty-second Day of December, 2009

David J. Kappos
*Director of the United States Patent and Trademark Office*